US012157671B2

(12) United States Patent
Rimboeck

(10) Patent No.: US 12,157,671 B2
(45) Date of Patent: Dec. 3, 2024

(54) METHOD FOR PRODUCING TECHNICAL SILICON

(71) Applicant: WACKER CHEMIE AG, Munich (DE)

(72) Inventor: Karl-Heinz Rimboeck, Heldenstein (DE)

(73) Assignee: WACKER CHEMIE AG, Munich (DE)

( * ) Notice: Subject to any disclaimer, the term of this patent is extended or adjusted under 35 U.S.C. 154(b) by 162 days.

(21) Appl. No.: 17/441,529

(22) PCT Filed: Mar. 22, 2019

(86) PCT No.: PCT/EP2019/057287
§ 371 (c)(1),
(2) Date: Sep. 21, 2021

(87) PCT Pub. No.: WO2020/192870
PCT Pub. Date: Oct. 1, 2020

(65) Prior Publication Data
US 2022/0169519 A1 Jun. 2, 2022

(51) Int. Cl.
*C01B 33/025* (2006.01)
*C01B 33/037* (2006.01)

(52) U.S. Cl.
CPC .......... *C01B 33/025* (2013.01); *C01B 33/037* (2013.01); *C01P 2006/80* (2013.01)

(58) Field of Classification Search
CPC ... C01B 33/025; C01B 33/037; C01P 2006/80
See application file for complete search history.

(56) References Cited

U.S. PATENT DOCUMENTS

| | | | | |
|---|---|---|---|---|
| 4,247,528 A * | 1/1981 | Dosaj | ..................... | C01B 33/025 136/261 |
| 10,090,513 B2 * | 10/2018 | Canham | ................ | C01B 33/023 |
| 2011/0236291 A1 * | 9/2011 | Lang | ......................... | C01B 3/22 422/600 |
| 2018/0237306 A1 * | 8/2018 | Shahverdi | ............. | C01B 33/033 |
| 2019/0077672 A1 * | 3/2019 | Otter | ....................... | C03C 1/022 |
| 2021/0167360 A1 * | 6/2021 | Aurora | .................. | H01M 4/134 |
| 2022/0212937 A1 * | 7/2022 | Rimb?ck | ............... | C01B 33/037 |

FOREIGN PATENT DOCUMENTS

| | | | |
|---|---|---|---|
| CN | 102910631 A | 2/2013 | |
| CN | 109052407 A | 12/2018 | |
| EP | 0699625 B1 | 3/1999 | |
| WO | WO-2010037694 A2 * | 4/2010 | .......... B01J 19/0053 |

OTHER PUBLICATIONS

Itaka et al., Direct Carbothermic Silica Reduction from Purified Silica to Solar-Grade Silicon, 2015 J. Phys.: Conf. Ser. 596 012015.*
Machine translation of CN109052407A, publication date Dec. 21, 2018.*
Gribov B G et al, "Preparation of High-Purity Silicon for Solar Cells", Inorganic Materials, Plenum Publishing Co., New York, NY, US, (2003), vol. 39, No. 7, doi:10.1023/A:1024553420534, ISSN 0020-1685, pp. 653-662, XP002597927 [X] 1 * p. 657, paragraph Liquid Extraction.
Aleksandar M.Mitrasinovic, Ryan D'Souza, Torstein A. Utigard, "Impurity removal and overall rate constant during low pressure treatment of liquid silicon", Journal of Materials Processing Technology, (2012), vol. 212, No. 1, doi:10.1016/j.jmatprotec.2011.08.006, pp. 78-82, XP028103135 [A] 1-7.
R. C. Breneman and J. W. Halloran, "Kinetics of Cristobalite Formation in Sintered Silica Glass," J. Am. Ceram. Soc., 97, 2272-8 (2014).
A. Schei, J.K. Tuset, H. Tveit: "Production of High Silicon Alloys," 1998, Tapir forlag, Trondheim.

* cited by examiner

*Primary Examiner* — Jun Li
(74) *Attorney, Agent, or Firm* — BROOKS KUSHMAN P.C.

(57) ABSTRACT

Technical-grade silicon is produced by reacting a raw material mixture containing silicon dioxide and carbon in an electric furnace with a particulate mediator containing at least one of the elements C, O, Al and Si is reacted in an electric furnace, wherein the mixture is described by a dimensionless index K, K having a value of from 0 to 745 and being calculated as follows:

$$K = \omega_M \cdot \beta_{RM} \cdot \mu_C \qquad \text{equation (1)}$$

where:

$$\omega_M = \frac{6 \cdot (1 - \varepsilon_{m,M})}{d_{50,M}} \qquad \text{equation (2)}$$

$$\beta_{RM} = d_{90,RM} - d_{10,RM} \qquad \text{equation (3)}$$

$$\mu_C = \frac{3}{2} - \frac{m_M}{m_{RM}} \qquad \text{equation (4)}$$

where the meanings of $\omega_M$, $\varepsilon_{m,M}$, $\beta_{RM}$, $\mu_C$, $d_{50,M}$, $d_{90,RM}$, $m_M$ and $m_{RM}$ are explained in claim 1.

17 Claims, No Drawings

METHOD FOR PRODUCING TECHNICAL SILICON

CROSS REFERENCE TO RELATED APPLICATIONS

This application is the U.S. National Phase of PCT Appln. No. PCT/EP2019/057287 filed Mar. 22, 2019, the disclosure of which is incorporated in its entirety by reference herein.

BACKGROUND OF THE INVENTION

1. Field of the Invention

The invention relates to a method for producing technical-grade silicon from silicon dioxide and carbon and a particulate mediator containing at least one of the elements C, O, Al and Si in an electric furnace.

2. Description of the Related Art

Silicon is used nowadays in technical-grade (Si content <99.9% by mass, also referred to as technical-grade silicon) in particular in silicothermic processes, in metal extraction, as a deoxidizer in steel production and serves as an alloying constituent for cast alloys of aluminum, copper, titanium and iron, and also as a starting material for chemical compounds.

Technical-grade silicon corresponds here especially to what is known as "calcium silicon" (calcium disilicide $CaSi_2$, approx. 60% by mass Si and approx. 40% by mass Ca), ferrosilicon (alloys of approx. 45-90% by mass Si and approx. 10-55% by mass Fe), and metallurgical silicon (approx. 98-99.5% by mass Si).

Industrially, technical-grade silicon is produced by the carbothermic reduction of quartz ($SiO_2$; optionally further additives such as for example Fe-containing waste materials [ferrosilicon] or calcium carbide [calcium silicon]) at high temperatures (around 2000° C.) and atmospheric pressure in an electric furnace (arc reduction furnace) according to net reaction equation (1). The process is described in the standard work "Production of High Silicon Alloys" (A. Schei, J. K. Tuset, H. Tveit, *Production of High Silicon Alloys*, 1998, Tapir forlag, Trondheim).

$$SiO_2 + 2\ C \rightarrow Si(l) + 2\ CO(g) \quad (1)$$

During operation, the reactants, intermediates and products are present in different states of matter: solid (C, SiC, $SiO_2$, Si), liquid (Si, $SiO_2$) and gaseous (predominantly CO, SiO). The carbon source used is typically a reduction mixture composed of coke, petroleum coke, bituminous coal, charcoal and wood particles. A strongly reducing atmosphere composed especially of SiO and CO prevails in the furnace. During operation $SiO_2$ and C move downwards while SiO and CO flow upwards. Intermediate species are formed according to the following reaction equations (2)-(7):

$$SiO_2 + C \rightarrow SiO + CO \quad (2)$$

$$SiO + 2\ C \rightarrow SiC + CO \quad (3)$$

$$SiO_2 + 2\ SiC \rightarrow 3\ Si + 2\ CO \quad (4)$$

$$2\ SiO_2 + SiC \rightarrow 3\ SiO + CO \quad (5)$$

$$SiO_2 + CO \rightarrow SiO + CO_2 \quad (6)$$

$$2\ CO_2 + SiC \rightarrow SiO + 3\ CO \quad (7)$$

Silicon is predominantly formed by the reaction shown in reaction (8).

$$SiO + SiC \rightarrow 2\ Si + CO \quad (8)$$

When producing technical-grade silicon, reactions (9) and (10) are undesired. If SiO leaves the furnace, $SiO_2$ forms as a result of oxidation in the ambient air according to reaction (9), agglomeration of which forms the finely divided byproduct microsilica, which departs the reaction space via the offgas system and ultimately constitutes a loss of yield. The condensation reaction (10) results in formation of glassy zones in the upper portion of the furnace, which may prevent the escape of offgases.

$$2\ SiO + O_2 \rightarrow 2\ SiO_2 \quad (9)$$

$$2\ SiO \rightarrow Si + SiO_2 \quad (10)$$

The optimal use of SiO is therefore important not only from economic viewpoints, in particular the loss due to the formation of microsilica, but also in terms of plant safety.

In addition to the economic aspects of an industrial process (for example productivity, production costs), the quality of the products produced is also of critical importance. The raw materials and electrodes typically used in the carbothermic reduction of $SiO_2$ contain various impurities which, in the case of technical-grade silicon, usually lead to a content of secondary constituents of from 0.5% to 2% by mass in the product.

When using technical-grade silicon in the production of chemical compounds, for example chlorosilanes, these impurities (for example in the form of volatile chlorides) are partially—and despite interposed purification steps—carried over into the respective end products (e.g. polycrystalline silicon, silicones) in the course of a plurality of process steps. Depending on the field of use, however, these end products have to satisfy extremely high quality requirements (semiconductor/pharmaceuticals/foodstuffs/cosmetics industries). For the production of these products on an industrial scale, a high-quality starting material—technical-grade silicon—is therefore important.

In principle, metallurgical processes for producing silicon are complex and energy-intensive (Schei et al.). The required supply of energy, which is generally effected by electrical means, represents a considerable cost factor. The operational performance (for example measured by the amount of technical-grade silicon formed per unit of time and reaction volume, specific energy use) of the carbothermic reduction of quartz in an electric furnace depends crucially on the raw materials and the corresponding formulations (the manner in which the raw materials are supplied to the reduction process).

SUMMARY OF THE INVENTION

The object of the present invention was that of improving the economics of the production of technical-grade silicon, without negatively affecting the quality of the product.

The invention provides a method for producing technical-grade silicon,
in which a mixture of a raw material mixture containing silicon dioxide and carbon
with a particulate mediator containing at least one of the elements C, O, Al and Si is reacted in an electric furnace, wherein
the mixture is described by a dimensionless index K, K having a value of from 0 to 745 and being calculated as follows:

$$K = \omega_M \cdot \beta_{RM} \cdot \mu_C \quad \text{equation (1)}$$

where:

$$\omega_M = \frac{6 \cdot (1 - \varepsilon_{m,M})}{d_{50,M}} \quad \text{equation (2)}$$

$$\beta_{RM} = d_{90,RM} - d_{10,RM} \quad \text{equation (3)}$$

$$\mu_C = \frac{3}{2} - \frac{m_M}{m_{RM}} \quad \text{equation (4)}$$

where:
$\omega_M$ characteristic surface area-to-volume coefficient of the particulate mediator [1/mm]
$\varepsilon_{m,M}$ mean, effective porosity of the particulate mediator
$\beta_{RM}$ breadth of a particle size distribution of the mixture [mm]
$\mu_C$ mass ratio of mediator to raw material mixture in the mixture
$d_{50,M}$ particle size (diameter) at 50% of the mass undersize of the grading curve of the mediator [mm]
$d_{90,RM}$ particle size (diameter) at 90% of the mass undersize of the grading curve of the raw material mixture [mm]
$d_{10,RM}$ particle size (diameter) at 10% of the mass undersize of the grading curve of the mixture [mm]
$m_M$ mass of the mediator in the mixture [kg]
$m_{RM}$ mass of the raw material mixture in the mixture [kg].

DETAILED DESCRIPTION OF THE PREFERRED EMBODIMENTS

Surprisingly, it has been found that the addition of a mediator, after which the mixture has a value K of from 0 to 745, can increase the productivity of the production of technical-grade silicon by means of carbothermic reduction of silicon dioxide. This is caused by a reduction in losses of silicon and energy as a result of more efficient use of SiO in the electric furnace.

The method according to the invention thus increases the productivity of the production process for technical-grade silicon, for example measured by the amount of technical-grade silicon formed per unit of time and reaction volume, compared to conventional methods, without reducing the quality of the technical-grade silicon.

The particulate mediator contains at least one or more of the elements from the group comprising C, O, Al and Si or a compound or a plurality of compounds of these elements or mixtures of these elements and compounds. In addition to the elements already described, the particulate mediator may preferably contain the following elements as impurities: Li, Na, K, Mg, Ca, Ba, Ti, Zr, V, Cr, Mo, W, Mn, Fe, Co, Ni, Cu, Zn, B, Sn, Pb, N, P, As, Sb, Bi, S.

In a preferred embodiment, the mediator contains silicon residues which are preferably selected from by-products or wastes arising in the production or in the mechanical treatment of silicon, such as polycrystalline, multicrystalline or monocrystalline silicon. The mechanical treatment may in particular be crushing, grinding and sawing. The silicon residues contain silicon metal and/or silicon compounds such as $SiO_2$ and SiC. Purification of the silicon residues is typically not required prior to use in the mediator, that is to say that the silicon residues can be used without further purification steps. The mediator preferably contains at least 10% by mass, more preferably at least 20% by mass of silicon residues.

Due to the high purity of these silicon residues compared to the usual raw materials for the production of technical-grade silicon, the expense for refining technical-grade silicon for further use thereof is reduced with an increasing mediator content in a mixture.

Preferred components of the particulate mediator are $SiO_2$ having a preferred content of $SiO_2$ in the cristobalite polymorph of >1% by mass, SiC, silicon metal and silicon-containing material having a preferred silicon metal content of 30-99.99999% by mass, more preferably 35-99% by mass, especially 40-95% by mass. The residual contents of the particulate mediator can preferably contain the following elements: C, O, Al, Li, Na, K, Mg, Ca, Ba, Ti, Zr, V, Cr, Mo, W, Mn, Fe, Co, Ni, Cu, Zn, B, Sn, Pb, P, As, Sb, Bi, S, and C. C preferably comprises a content of fixed C of greater than 85% by mass. Al is preferably present as $Al_2O_3$.

If the mediator is a mixture of individual components, the components may in each case be present as homogeneous particles and/or particles may be specifically produced from the individual components, for example by compacting/agglomerating, for example by pelletizing or sintering. The latter is preferably advised when one or more of the individual components has a particle size of <1 mm, since these particles are entrained and hence withdrawn from the process via the offgas system on account of the prevailing, relatively high gas speeds at which the gases flow through the furnace and ultimately exit as offgas. Discharging of raw materials and/or of the mediator reduces the economic viability and also jeopardizes process performance.

The individual components of the mediator are preferably subjected to a comminution (e.g. grinding, crushing), classifying (e.g. sieving, sifting) and/or agglomeration process (e.g. pelletizing, briquetting, sintering) in order to obtain the desired value for index K.

The mixture used in the method preferably consists of the constituents silicon dioxide and carbon and the mediator.

In the method, the silicon dioxide in the raw material mixture is preferably selected from quartz and quartzite. In the method, the carbon in the raw material mixture is preferably selected from coke, petroleum coke, bituminous coal, charcoal and wood particles.

The proportion of the mediator in the mixture of raw material mixture and mediator is preferably 1% to 60% by mass, more preferably 2% to 50% by mass, and most preferably 3% to 30% by mass, especially 5% to 20% by mass.

The particulate mediator preferably has the following properties:
mean, mass-weighted, effective porosity: from 0 to 1, more preferably from 0.05 to 0.95, yet more preferably from 0.05 to 0.8, and especially 0.05 to 0.5.
Particle size (diameter) at 50% of the mass undersize of the grading curve of the mediator, $d_{50,M}$: from 1.5 to 150 mm, more preferably 3 to 130 mm, preferably 5 to 100 mm, especially 5 to 85 mm.

Particle size of from 1.5 to 300 mm, more preferably from 5 to 250 mm, yet more preferably from 10 to 150 mm, and especially from 10 to 100 mm.

The constituents of the raw materials of a mixture preferably have the following particle sizes:
$SiO_2$: Particle size of from 5 to 200 mm, more preferably from 10 to 150 mm, yet more preferably from 25 to 125 mm, and especially from 50 to 100 mm.
C: Particle size of from 1.5 to 100 mm, more preferably from 2 to 75 mm, yet more preferably from 3 to 50 mm, and especially from 5 to 30 mm.

The constituents of the raw material mixture are preferably used in the following $Si/C_{fixed}$ molar ratios: from 0.2 to 0.7, more preferably from 0.3 to 0.6, yet more preferably from 0.35 to 0.55, and especially from 0.4 to 0.5.

The term "fixed carbon" ($C_{fixed}$) is understood to mean the solid, combustible residue of a carbon-containing material which remains after heating a sample at 900° C. for a period of seven minutes—in order to reduce the volatile constituents thereof. $C_{fixed}$ may be determined for example by means of a LECO TGA701 instrument at www.leco.co.za/wp-content/uploads/2012/02/TGA701_COKE_203-821-381.pdf; sample preparation according to ASTM Method D2013 or ASTM Practice D346).

The raw material mixture of a mixture further preferably has the following properties:
$d_{90,RM}$: more preferably from 10 to 120 mm, yet more preferably from 20 to 110 mm, especially from 50 to 100 mm.
$d_{10,RM}$: more preferably from 1.5 to 75 mm, yet more preferably 2 to 75 mm, especially 3 to 50 mm.

The silicon content of the $SiO_2$ source is preferably determined by X-ray fluorescence analysis. Determined as secondary constituents are: Fe, Al, Ca, Ti, K and Mg.

The constituents of the mixture can be introduced into the furnace together or separately from one another. The addition may be carried out manually or automatically.

Mixtures of particulate substances having a particle diameter of predominantly >0.1 mm are typically subjected to sieve analyses to characterize the particle mixture. Determination of particle size distribution by sieve analysis is carried out according to DIN 66165. Calculation of average particle sizes/diameters from particle size distributions may be carried out according to DIN ISO 9276-2.

The total porosity of a substance is made up of the sum total of the cavities which are connected to each other and to the environment (open porosity; in the present invention referred to as effective porosity) and the cavities not connected to each other (closed porosity). Porosity measurements are carried out in accordance with Archimedes' principle according to ASTM C373-88.

The cristobalite content can be determined for example via quantitative X-ray diffraction using an internal $TiO_2$ standard (anatase). (R. C. Breneman and J. W. Halloran, "Kinetics of Cristobalite Formation in Sintered Silica Glass", J. Am. Ceram. Soc., 97, 2272-8 (2014))

EXAMPLES

Various mixtures were used—in each case over a production day—in an arc reduction furnace (specific energy consumption per ton of tapped crude silicon produced: 11.2 MWh/t) and the performance of the process was measured on the basis of the formation of the by-product microsilica. The Si quantity equivalent quotient [microsilica]/Si quantity equivalent [mixture] was determined for one production day. This quotient is referred to hereinbelow as the loss quotient (LQ). At an LQ value of 0.15 or less the process is considered particularly productive. This value is typically between 0.12 and 0.15. Various particulate mediators were tested in various mixtures. Table 1 gives an overview of the results of the experiments.

Comparative Examples (CE) not According to the Invention

Mixtures: Raw material mixture ($SiO_2$ source and carbon-containing reducing agent; Si:fixed C molar ratio=0.4-0.5), and for CE 1 no mediator and for CE 2 too much particulate mediator.

Working Examples (WE)

Mixtures: Raw material mixture ($SiO_2$ source and carbon-containing reducing agent; Si:fixed C molar ratio=0.4-0.5) and particulate mediator. The elements Si, Al, O and C were present in the mediator in the molar ratios 6.7:1.5.6:1.8 (Si:Al:O:C); the total—i.e. based on the total mass of the mediator—silicon metal content was 39.8% by weight. The formation of glassy zones according to reaction (10) was not observed for any of the experiments performed according to the invention.

Fixed C was determined by means of a LECO TGA701 instrument. See www.leco.co.za/wp-content/uploads/2012/02/TGA701_COKE_203-821-381.pdf; sample preparation according to ASTM Method D2013 or ASTM Practice D346).

The silicon content of the $SiO_2$ source was determined by X-ray fluorescence analysis. The following elements were analyzed as secondary constituents: Fe, Al, Ca, Ti, K and Mg.

TABLE 1

| Example | $\omega_M$ [1/mm] | $\beta_{RM}$ [mm] | $\mu_C$ | Index K | LQ |
| --- | --- | --- | --- | --- | --- |
| CE 1* | — | 80 | — | — | 0.13 |
| CE 2* | 0.064 | 80 | −0.36 | −1.82 | 0.17 |
| WE 1 | 0.064 | 80 | 0.00 | 0.00 | 0.11 |
| WE 2 | 0.064 | 80 | 0.50 | 2.55 | 0.11 |
| WE 3 | 0.064 | 80 | 1.07 | 5.46 | 0.10 |
| WE 4 | 0.064 | 80 | 1.25 | 6.38 | 0.09 |
| WE 5 | 0.064 | 80 | 1.45 | 7.38 | 0.09 |
| WE 6 | 0.064 | 80 | 1.49 | 7.60 | 0.10 |
| WE 7 | 0.051 | 80 | 1.49 | 6.08 | 0.11 |
| WE 8 | 0.102 | 80 | 1.49 | 12.2 | 0.09 |
| WE 9 | 0.340 | 80 | 1.49 | 40.5 | 0.09 |
| WE 10 | 1.02 | 80 | 1.49 | 122 | 0.12 |
| WE 11 | 3.40 | 80 | 1.49 | 405 | 0.12 |
| WE 12 | 0.200 | 80 | 1.49 | 23.8 | 0.12 |
| WE 13 | 2.00 | 80 | 1.49 | 238 | 0.11 |
| WE 14 | 3.96 | 80 | 1.49 | 472 | 0.12 |
| WE 15 | 3.40 | 125 | 1.49 | 633 | 0.10 |
| WE 16 | 0.200 | 125 | 1.49 | 37.3 | 0.12 |
| WE 17 | 2.00 | 125 | 1.49 | 373 | 0.11 |
| WE 18 | 3.96 | 125 | 1.49 | 738 | 0.12 |
| WE 19 | 4.00 | 125 | 1.49 | 745 | 0.12 |

*not according to the invention

The examples prove that the use according to the invention of mediators in the production of metallurgical silicon is economically advantageous.

The invention claimed is:
1. A method for producing technical-grade silicon by carbothermic reduction of silicon dioxide by carbon in an electric furnace, comprising:
   supplying a reactant mixture comprising silicon dioxide and carbon, together with a particulate mediator comprising elemental silicon, SiC, or a mixture thereof to the electric furnace, and reacting to form metallic silicon from the reactant mixture, wherein a mixture of the reactant mixture and particulate mediator is described by a dimensionless index K, calculated as follows:

$$K = \omega_M \cdot \beta_{RM} \cdot \mu_C \qquad \text{equation (1)}$$

where:

$$\omega_M = \frac{6 \cdot (1 - \varepsilon_{m,M})}{d_{50,M}} \qquad \text{equation (2)}$$

$$\beta_{RM} = d_{90,RM} - d_{10,RM} \qquad \text{equation (3)}$$

$$\mu_C = \frac{3}{2} - \frac{m_M}{m_{RM}} \qquad \text{equation (4)}$$

where:
$\omega_M$ is a characteristic surface area-to-volume coefficient of the particulate mediator [1/mm]
$\varepsilon_{m,M}$ is the mean effective porosity of the particulate mediator, and ranges from 0 to 0.95,
$\beta_{RM}$ is the breadth of a particle size distribution of the reactant mixture [mm]

$$\frac{m_M}{m_{RM}}$$

is the mass ratio of particulate mediator to reactant mixture in the mixture $d_{50,M}$ is the particle size (diameter) at 50% of the mass undersize of the grading curve of the particulate mediator [mm]
$d_{90,RM}$ is the particle size (diameter) at 90% of the mass undersize of the grading curve of the reactant mixture [mm]
$d_{10,RM}$ is the particle size (diameter) at 10% of the mass undersize of the grading curve of the reactant mixture [mm]
$m_M$ is the mass of the particulate mediator in the mixture [kg]
$m_{RM}$ is the mass of the reactant mixture in the mixture [kg],
wherein K has a value within the range of from 0 to 745.

2. The method of claim 1, in which the silicon residues are by-products and/or wastes arising from the production of elemental silicon or in the mechanical treatment of elemental silicon.

3. The method of claim 2, in which the particulate mediator contains at least 10% by mass of elemental silicon residues.

4. The method of claim 1, wherein the particulate mediator contains from 30-95 wt. % of silicon in elemental form.

5. The method of claim 1, in which the proportion of the particulate mediator in the mixture of reactants and particulate mediator is from 1% to 60% by mass based on the total weight of the reactants and particulate mediator.

6. The method of claim 1, in which an $Si/C_{fixed}$ molar ratio in the reactants is from 0.2 to 0.7, wherein $C_{fixed}$ is the solid, combustible residue of a carbon-containing material which remains after heating a sample at 900° C. for a period of seven minutes, determined according to ASTM Method D2013 or ASTM Practice D346.

7. The method of claim 1, wherein the particulate mediator reduces the amount of microsilica formed by the oxidation of SiO and reduces glassy deposits resulting from a condensation reaction of silicon monoxide.

8. A method for producing technical-grade silicon by carbothermic reduction of silicon dioxide by carbon in an electric furnace, comprising:

supplying a reactant mixture comprising silicon dioxide and carbon, together with a particulate mediator comprising elemental silicon, SiC, or a mixture thereof to the electric furnace, and reacting to form metallic silicon from the reactant mixture, wherein a mixture of the reactant mixture and particulate mediator is described by a dimensionless index K, $$K = \omega_M \cdot \beta_{RM} \cdot \mu_C \qquad \text{equation (1)}$$

where:

$$\omega_M = \frac{6 \cdot (1 - \varepsilon_{m,M})}{d_{50,M}} \qquad \text{equation (2)}$$

$$\beta_{RM} = d_{90,RM} - d_{10,RM} \qquad \text{equation (3)}$$

$$\mu_C = \frac{3}{2} - \frac{m_M}{m_{RM}} \qquad \text{equation (4)}$$

where:
$\omega_M$ is a characteristic surface area-to-volume coefficient of the particulate mediator [1/mm]
$\varepsilon_{m,M}$ is the mean effective porosity of the particulate mediator, and ranges from 0 to 0.80,
$\beta_{RM}$ is the breadth of a particle size distribution of the reactant mixture [mm]

$$\frac{m_M}{m_{RM}}$$

is the mass ratio of particulate mediator to raw material mixture in the mixture
$d_{50,M}$ is the particle size (diameter) at 50% of the mass undersize of the grading curve of the particulate mediator [mm], and ranges from 1.5 to 150 mm,
$d_{90,RM}$ is the particle size (diameter) at 90% of the mass undersize of the grading curve of the reactant mixture [mm], and ranges from 10 to 120 mm,
$d_{10,RM}$ is the particle size (diameter) at 10% of the mass undersize of the grading curve of the reactant mixture [mm], and ranges from 1.5 to 75 mm,
$m_M$ is the mass of the particulate mediator in the mixture [kg]
$m_{RM}$ is the mass of the reactant mixture in the mixture [kg], wherein $$\frac{m_M}{m_{RM}}.$$

is from 0.01 to 0.60, and
wherein K has a value within the range of 0 to 706.26.

9. The method of claim 8, wherein K has a value within the range of 2.55 to 706.26.

10. The method of claim 8, wherein the particulate mediator comprises elemental silicon residues which are byproducts and/or waste arising in production of elemental silicon or in mechanical treatment of elemental silicon.

11. The method of claim 10, wherein the mechanical treatment of elemental silicon comprises at least one of crushing elemental silicon, grinding elemental silicon, and sawing elemental silicon.

12. The method of claim 8, wherein the particulate mediator contains from 30-99.99999 wt. % elemental silicon.

13. The method of claim 8, wherein the particulate mediator further contains aluminum oxide.

14. A method for producing technical-grade silicon by carbothermic reduction of silicon dioxide by carbon, wherein the formation of microsilica by the reaction: $2SiO+O_2 \rightarrow 2SiO_2$ and formation of glassy silica in the reactor by the reaction $2SiO \rightarrow Si+SiO_2$, are both reduced, the method comprising introducing into an electric furnace, a reactant mixture comprising silica and fixed carbon in a molar ratio of 0.2 to 0.7, and an amount of a silicon-containing particulate mediator in an amount such that the particulate mediator constitutes from 1 to 60 weight of the weight of a mixture of mediator and reactant mixture, wherein the silicon containing particulate mediator comprising elemental silicon, SiC, or a mixture thereof, wherein the mixture of reactants and particulate mediator are characterized by a dimensionless index K, calculated as follows:

$$K = \omega_M \cdot \beta_{RM} \cdot \mu_C \quad \text{equation (1)}$$

where:

$$\omega_M = \frac{6 \cdot (1 - \varepsilon_{m,M})}{d_{50,M}} \quad \text{equation (2)}$$

$$\beta_{RM} = d_{90,RM} - d_{10,RM} \quad \text{equation (3)}$$

$$\mu_C = \frac{3}{2} - \frac{m_M}{m_{RM}} \quad \text{equation (4)}$$

where:
$\omega_M$ is a characteristic surface area-to-volume coefficient of the particulate mediator [1/mm]

$\varepsilon_{m,M}$ is the mean effective porosity of the particulate mediator, and ranges from 0 to 0.80, $\beta_{RM}$ is the breadth of a particle size distribution of the reactant mixture [mm]

$$\frac{m_M}{m_{RM}}$$

is the mass ratio of mediator to reactant mixture in the mixture $d_{50,M}$ is the particle size (diameter) at 50% of the mass undersize of the grading curve of the particulate mediator [mm], and ranges from 1.5 to 150 mm, $d_{90,RM}$ is the particle size (diameter) at 90% of the mass undersize of the grading curve of the reactant mixture [mm], and ranges from 10 to 120 mm, $d_{10,RM}$ is the particle size (diameter) at 10% of the mass undersize of the grading curve of the reactant mixture [mm], and ranges from 1.5 to 75 mm, $m_M$ is the mass of the mediator in the mixture [kg]

$m_{RM}$ is the mass of the raw material mixture in the mixture [kg], wherein $$\frac{m_M}{m_{RM}}$$

is from 0.01 to 0.60,
wherein the value of K is in the range of from 0 to 706.26.

15. The method of claim 14, wherein the calculated value of K is from 2.55 to 706.26.

16. The method of claim 14, wherein the mediator contains from 30-95 wt. % of elemental silicon.

17. The method of claim 14, wherein the particulate mediator contains from 30-99.99999 wt. % elemental silicon.

* * * * *